United States Patent [19]

Knize et al.

[11] Patent Number: 4,976,938

[45] Date of Patent: Dec. 11, 1990

[54] HYDROGEN ISOTOPE SEPARATION UTILIZING BULK GETTERS

[75] Inventors: Randall J. Knize, Los Angeles, Calif.; Joseph L. Cecchi, Lawrenceville, N.J.

[73] Assignee: The United States of America as represented by the United States Department of Energy, Washington, D.C.

[21] Appl. No.: 379,841

[22] Filed: Jul. 14, 1989

[51] Int. Cl.$^5$ .............................................. B01D 59/00
[52] U.S. Cl. ................................. 423/249; 423/648.1; 423/647.7; 423/DIG. 7; 423/644; 376/189; 376/314; 55/66; 55/74; 55/387
[58] Field of Search ............................. 55/66, 74, 387; 423/DIG. 7, 648.1, 249; 376/189, 314; 252/181.6; 422/159, 903

[56] References Cited

U.S. PATENT DOCUMENTS

| | | | |
|---|---|---|---|
| 2,780,526 | 2/1957 | Fleck | 423/DIG. 7 |
| 4,075,312 | 2/1978 | Tanaka et al. | 423/648.1 |
| 4,312,669 | 1/1982 | Boffito et al. | 75/177 |
| 4,476,100 | 10/1984 | Knize et al. | 423/249 |

FOREIGN PATENT DOCUMENTS 2207702 9/1987 Japan .
3017203 1/1988 Japan .

*Primary Examiner*—Edward A. Miller
*Assistant Examiner*—Ngoclan T. Mai
*Attorney, Agent, or Firm*—Mark P. Dvorscak; Robert J. Fisher; William R. Moser

[57] ABSTRACT

Tritium and deuterium are separated from a gaseous mixture thereof, derived from a nuclear fusion reactor or some other source, by providing a casing with a bulk getter therein for absorbing the gaseous mixture to produce an initial loading of the getter, partially desorbing the getter to produce a desorbed mixture which is tritium-enriched, pumping the desorbed mixture into a separate container, the remaining gaseous loading in the getter being deuterium-enriched, desorbing the getter to a substantially greater extent to produce a deuterium-enriched gaseous mixture, and removing the deuterium-enriched mixture into another container. The bulk getter may comprise a zirconium-aluminum alloy, or a zirconium-vanadium-iron alloy. The partial desorption may reduce the loading by approximately fifty percent. The basic procedure may be extended to produce a multistage isotope separator, including at least one additional bulk getter into which the tritium-enriched mixture is absorbed. The second getter is then partially desorbed to produce a desorbed mixture which is further tritium-enriched. The last-mentioned mixture is then removed from the container for the second getter, which is then desorbed to a substantially greater extent to produce a desorbed mixture which is deuterium-enriched. The last-mentioned mixture is then removed so that the cycle can be continued and repeated. The method of isotope separation is also applicable to other hydrogen isotopes, in that the method can be employed for separating either deuterium or tritium from normal hydrogen.

10 Claims, 3 Drawing Sheets

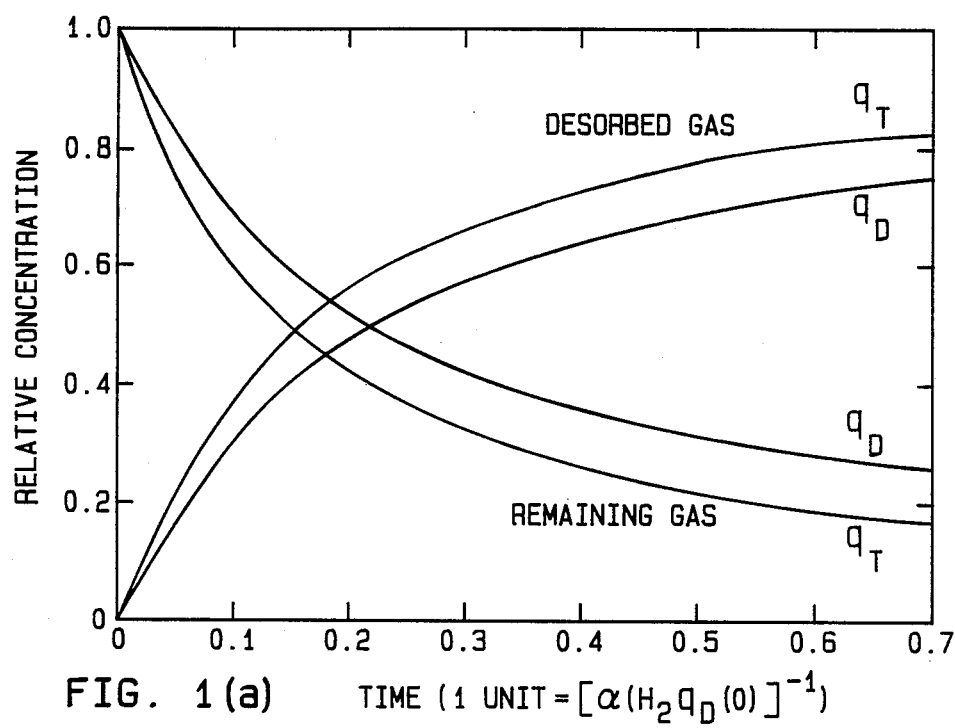
FIG. 1(a)   TIME (1 UNIT = $[\alpha(H_2 q_D(0)]^{-1}$)
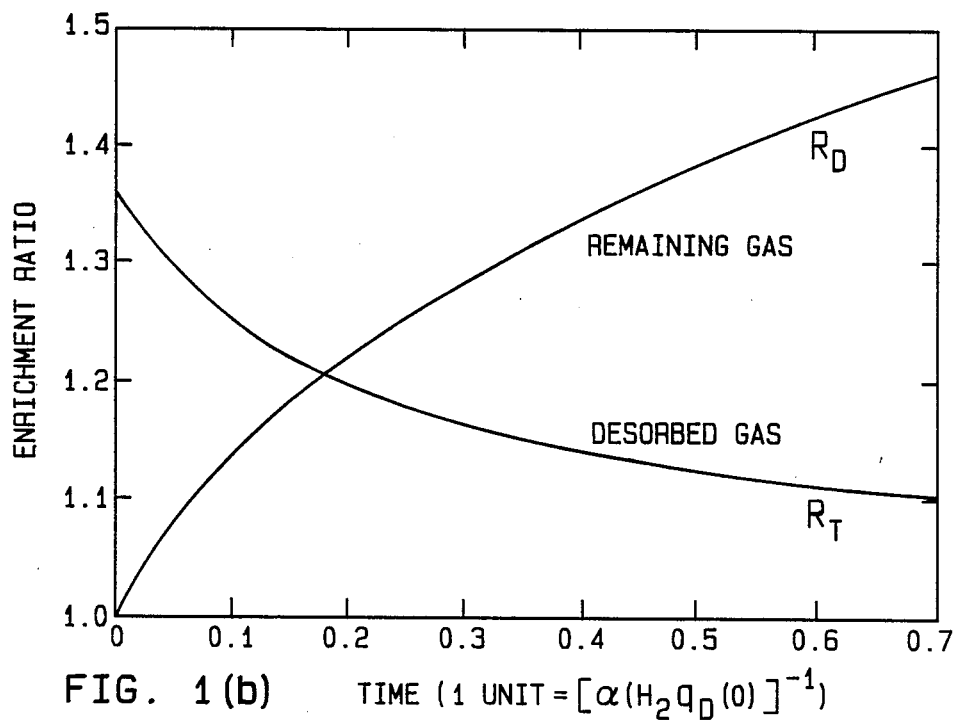
FIG. 1(b)   TIME (1 UNIT = $[\alpha(H_2 q_D(0)]^{-1}$)

HYDROGEN ISOTOPE SEPARATION UTILIZING BULK GETTERS

CONTRACTUAL ORIGIN OF THE INVENTION

The U.S. Government has rights in this invention pursuant to Contract No. DE-AC02-76-CHO-3073 between the U.S. Department of Energy and Princeton University.

FIELD OF THE INVENTION

This invention relates to a method and apparatus for the separation of hydrogen isotopes, particularly deuterium and tritium, as, for example, from gaseous products removed from nuclear fusion reactors, so that the deuterium and tritium can be separately recovered and reused. The present invention will have other applications in which it is necessary or desirable to separate hydrogen isotopes.

BACKGROUND OF THE INVENTION

Certain first generation fusion reactors are fueled by a fixed mixture of deuterium (D) and tritium (T) to produce helium residue or ash in the residual DT fuel mixture or effluent. Elimination of the helium necessitates removal of large quantities of the residual DT fuel mixture. After separation of the helium, it is desirable to separate the hydrogen isotopes and to reintroduce them separately back into the reactor. The present invention deals with the problem of separating the hydrogen isotopes.

Proposals have been made in the prior art for the use of several different hydrogen isotope separation methods, in connection with fusion reactors. Such methods include cryogenic distillation, gas chromatography, and thermal diffusion.

Cryogenic distillation separates the different hydrogen isotopes at their boiling points, approximately 20 degrees Kelvin. While cryogenic distillation is presently considered by some scientists to be the most practical isotope separation method for a fusion reactor, such method suffers from the problem that it requires a very large tritium inventory, greater than 100 g ($10^6$ Ci). Also, the expected cost of a cryogenic distillation separator is great, amounting to several millions of dollars.

As possible alternatives, gas chromatography and thermal diffusion have been proposed. The difficulty with these alternative methods is that the throughput is small (approximately 0.1 Torr liters/sec).

SUMMARY OF THE INVENTION

One object of the present invention is to provide a new and improved hydrogen isotope separation system which is highly productive, efficient and cost effective.

A further object of the present invention is to provide a new and improved hydrogen isotope separation system which avoids the drawbacks of other separation systems, in that the present invention does not require the great expense of a cryogenic system and can be implemented at a modest cost. Moreover, the present invention can provide a highly useful throughput, while requiring only a modest inventory of tritium. For example, the present invention can readily achieve a sufficient throughput, on the order of 10 Torr liters per second, to meet the needs of a fusion reactor, while requiring only a small tritium inventory, of approximately 1 g.

To achieve these and other objects, the present invention utilizes a getter system incorporating certain bulk getters to perform the desired hydrogen isotope separation on site. One example of a suitable bulk getter is ZrAl, which is a getter comprising zirconium and aluminum as an alloy or compound. The underlying principle involved in the separation process of the present invention is the relatively large isotope dependence of the hydrogen isotope desorption rates in certain operative getters, such as ZrAl. The operative bulk getters are employed in getter pumps which are supplied with the hydrogen isotope effluent from a fusion reactor, after the helium has been removed from the effluent, which thus primarily contains a mixture of the hydrogen isotopes, deuterium and tritium. The getter pumps are put through one or more cycles in which the hydrogen isotopes are alternately absorbed into the bulk getter, and then desorbed therefrom.

In the absorption portion of each cycle, the getter pump is supplied with the effluent mixture of the hydrogen isotopes, deuterium and tritium, under a pressure condition which is favorable for absorption of the isotopes into the getter. The pressure is generally subatmospheric, but relatively high, so that high absorption of the isotopes occurs. The isotopes are absorbed or dissolved in the getter until a condition of equilibrium or saturation is produced. Generally speaking, the amount of absorption is proportional to the square root of the pressure in the getter pump casing.

In the desorption portion of the cycle, a first valve is closed to close off the getter pump casing from the source of the isotope effluent. A second valve is opened to connect the pump casing to a vacuum pump, such as a turbomolecular pump, for example, which is employed to reduce the pressure in the pump casing. The reduced pressure causes selective or differential desorption of the isotopes, in that tritium is desorbed from the getter at a greater rate and to a greater extent than deuterium. Thus, tritium is enriched in the desorbed gas, so that the ratio of tritium to deuterium is higher in the desorbed gas than in the effluent mixture. On the other hand, deuterium is enriched in the remaining absorbed isotope mixture, still absorbed in the getter.

The separation system of the present invention may employ a plurality of getter pumps to produce a multistage separation system. Thus, the desorbed, tritium-enriched mixture from the first stage pump may be pumped into the chamber of a second stage pump, where the enriched mixture is absorbed into the getter of the second stage pump, which is then used in another cycle of absorption and desorption, to produce a still greater tritium enrichment in the desorbed isotope mixture from the second stage pump. Any desired number of additional stages can be employed.

After the tritium-enriched isotope mixture is pumped out of the casing of the first getter pump, the second valve is closed and the first pump casing is connected to another vacuum pump which reduces the pressure in the first pump casing to a lower level, so that the deuterium-enriched isotope mixture, still absorbed in the first getter, is substantially or largely desorbed. Thus, the first getter pump is ready for another complete cycle. The deuterium-enriched isotope mixture can be pumped into still another getter pump, which is put through a complete cycle of absorption and desorption, to produce still further deuterium enrichment.

The separation and recovery of tritium from the isotope effluent is more critical and important than the recovery of deuterium, because tritium is a scarcer and more expensive material than deuterium. However, the present invention contemplates a two-branch separation system, having a tritium recovery branch and a deuterium recovery branch. Each branch may employ a series of getter pumps to produce progressive separation, in that the tritium branch produces progressive enrichment and recovery of tritium, while the deuterium branch produces progressive enrichment and recovery of deuterium. The two branches may be cross connected, so that the tritium-enriched effluent of the deuterium branch is supplied to the appropriate portion of the tritium branch. Likewise, the deuterium-enriched effluent of the tritium branch is supplied to the appropriate location in the deuterium branch.

BRIEF DESCRIPTION OF THE DRAWINGS

Further objects, advantages and features of the present invention will appear from the detailed description, to follow presently, taken with the accompanying drawings, in which:

FIG. 1(a) comprises a set of graphs showing the desorbed and remaining gas as a function of time for a zirconium-aluminum (ZrAl) getter, initially loaded with equal concentrations of deuterium and tritium.

FIG. 1(b) comprises a set of related graphs showing the resultant isotope enrichment ratios $R_T$ and $R_D$ as a function of time for the desorbed and remaining gas in the ZrAl getter.

DETAILED DESCRIPTION OF ILLUSTRATIVE EMBODIMENTS

Figure 2:
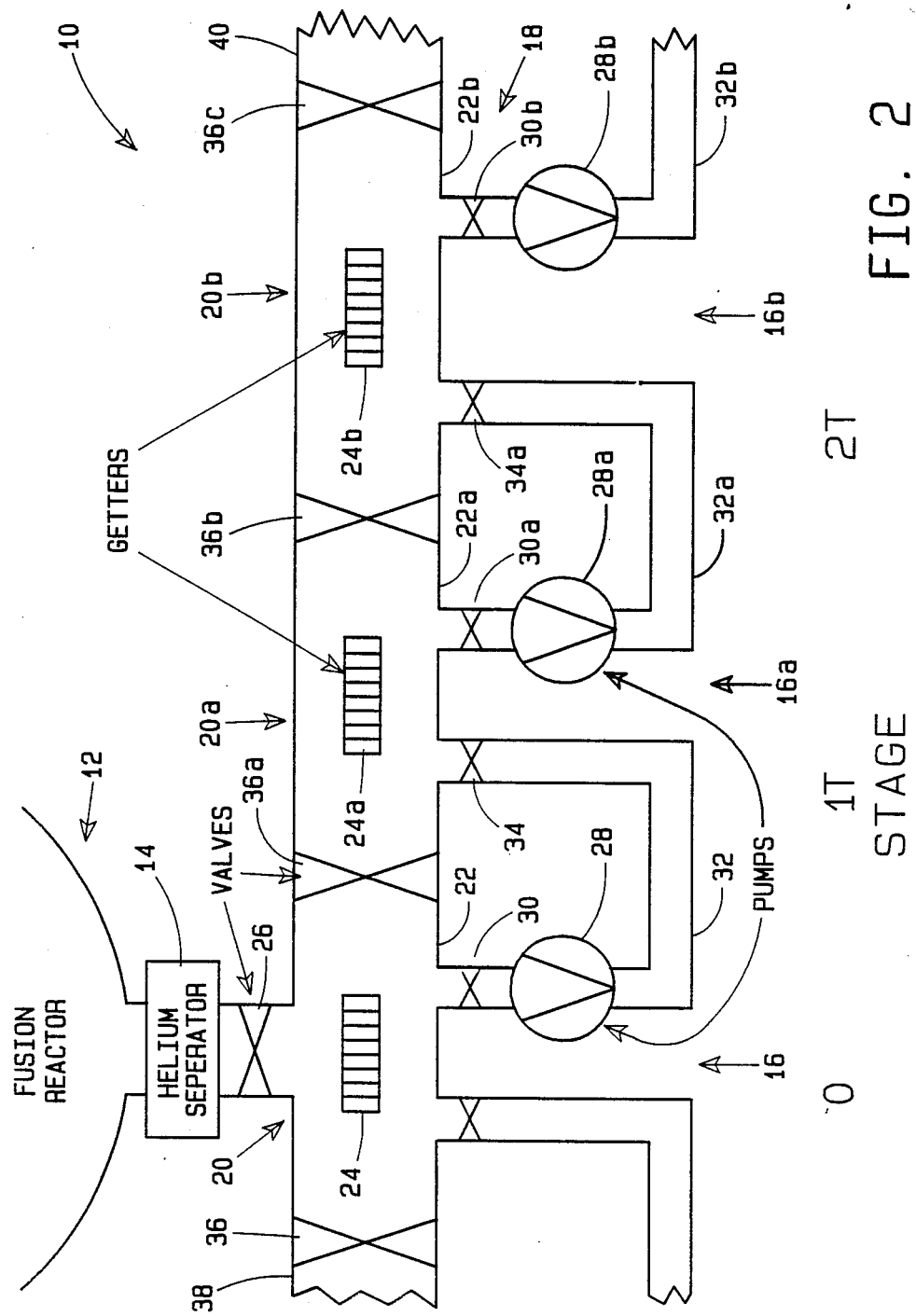
FIG. 2 is a schematic diagram of a multistage isotope separator system, to be described as an illustrative embodiment of the present invention.

It is believed that some initial attention to theoretical considerations will be helpful. Bulk getters can be used to pump hydrogen isotopes as well as other gases. In the case of a hydrogen isotope at a pressure P, this pumping will continue until equilibrium is reached. This equilibrium is described by Sievert's Law, $$p = Kq^2 \qquad (1)$$

where q is the bulk concentration of the isotope and K is an inverse measure of the solubility. The getter will pump as long as $P > Kq^2$. In order to satisfy this condition, bulk getters are usually operated at low temperature (20°–400° C.) where K is small. The hydrogen isotopes that the getter has pumped can be desorbed by using another pump such that the condition $P < Kq^2$ is satisfied. Desorption is usually done at high temperatures (500°–700° C.) where K is large.

Initially, the getter is assumed to be filled with deuterium and tritium at concentrations of $q_D(0)$ and $q_T(0)$, respectively. The equations describing the deuterium $q_D$ and tritium $q_T$ concentrations during desorption are $$\frac{\partial q_D}{\partial t} = -\alpha(D_2)q_D^2 - \frac{\alpha(DT)}{2} q_D q_T, \qquad (2)$$

$$\frac{\partial q_T}{\partial t} = -\alpha(T_2)q_T^2 - \frac{\alpha(DT)}{2} q_D q_T. \qquad (3)$$

In these equations, $\alpha(X) = S(X) K(X)/M$ determines the desorption rate and is a function of gas species X, where S(X) is the backup pumping speed used for desorption, K(X) describes the solubility, and M is the getter mass. For hydrogen desorption with a turbomolecular pump $S(X) \approx$ constant, so the isotopic dependence of $\alpha(X)$ will be mainly due to K(X). In the case of a bulk getter such as ZrAl, measurements and predictions indicate that for 500° C. < T < 700° C.

$$K(D_2) \approx 2.9\ K(H_2), \qquad (4)$$

$$K(DT) \approx 3.7\ K(H_2), \qquad (5)$$

$$K(T_2) \approx 4.6\ K(H_2) \qquad (6)$$

Equations (2) and (3) cannot be solved analytically since they are coupled. It is possible to examine some limiting cases. For $t \to \infty$, it is obvious that no enrichment can occur since all the hydrogen isotopes are totally desorbed. When the initial gas mixture is mostly one isotope such as tritium ($q_T >> q_D$) then the desorbed amounts at small times are $$Q_D = \int \frac{\partial q_D}{\partial T} dt \approx \frac{\alpha(DT)}{2} q_D(0) q_T(0) t, \qquad (7)$$

$$Q_T = \int \frac{\partial q_T}{\partial T} dt \approx \alpha(T_2) q_T^2(0) t, \qquad (8)$$

so the tritium enrichment ratio $R_T$ for the desorbed gas becomes $$R_T = \frac{Q_T/q_T(0)}{Q_D/q_D(0)} = \frac{2\alpha(T_2)}{\alpha(DT)}. \qquad (9)$$

For ZrAl, this enrichment ratio is about 2.5. A numerical solution to Eqs. (2) and (3) for a ZrAl getter initially loaded with equal concentrations of deuterium and tritium is shown in FIGS. 1(a) and 1(b). This solution shows the expected result that tritium is desorbed faster than deuterium and, therefore, isotopic enrichment is feasible. In this case, an enrichment ratio of $\approx 1.2$ can be obtained for both the desorbed and remaining gas when the getter is desorbed to $\approx \frac{1}{2}$ of its initial loading. In general, the enrichment ratio will be between 1.2 and 2.5 and depend on the initial loading.

While FIGS. 1(a) and 1(b) are largely self-explanatory, some elaboration may be helpful. FIG. 1(a) comprises a set of four graphs, showing the progression of the desorption process. The relative concentrations of the desorbed and remaining isotopes are plotted as a function of time. At the beginning of the process, all of the isotope gases are absorbed, so that the graphs representing the desorbed gases start from zero, while the graphs representing the remaining gases start from 1.0, which is the initial loading of the isotope gases in the bulk getter. With the passage of time, the graphs representing the desorbed gases ascend, while the other graphs, representing the remaining gases, descend. The desorbed tritium is greater than the desorbed deuterium, while the remaining deuterium is greater than the remaining tritium.

FIG. 1(b) comprises a set of two graphs representing the enrichment ratios as a function of time. The tritium enrichment ratio $R_T$ in the desorbed gas decreases with the passage of time. The deuterium enrichment ratio $R_D$ in the remaining gas increases as a function of time. This brief additional description of FIGS. 1(a) and 1(b) will clarify the previous discussion of the enrichment ratios.

FIG. 2 is a schematic diagram of a multistage isotope separator system 10, to be described as an illustrative embodiment of the present invention. The separator system 10 is adapted to separate and recover the tritium and deuterium contained in the residual or effluent gas mixture from a nuclear fusion reactor 12, which is illustrated by way of example. It will be understood that the separator system of the present invention may be employed to separate and recover tritium and deuterium from the effluent gas mixture discharged by any other suitable device or source.

As shown in FIG. 2, a helium separator 14 is preferably interposed between the fusion reactor 12 and the separator system 10, so that helium is removed from the gaseous effluent of the fusion reactor 12, before the gaseous effluent is supplied to the separator system 10. The helium separator 14 may utilize any known or suitable method and means for separating helium from the gaseous effluent. Those skilled in the art will be familiar with various suitable helium separators.

The isotope separator system 10 is a multistage construction. Virtually any number of stages may be employed, to achieve the desired degree of separation between the hydrogen isotopes, deuterium and tritium. As specifically illustrated in FIG. 2, the separator system 10 comprises three separator stages 16, 16a and 16b. The stage 16 may be regarded as the basic stage, while the stages 16a and 16b may be regarded as belonging to the tritium branch 18 of the separator system 10. The tritium branch 18 may have additional stages.

Generally, the separator system 10 also comprises a deuterium branch, which is not illustrated, because it is the same as the tritium branch 18. As shown, the tritium branch 18 extends to the right from the basic separator stage 16. The deuterium branch may be thought of as extending to the left. However, the right and left directions are simply a matter of illustration and are not important as a matter of substance.

The illustrated basic separator stage 16 comprises a getter pump 20 having a pump casing or chamber 22 in which a bulk getter 24 is mounted. Similarly, the separator stages 16a and 16b comprise getter pumps 20a and 20b having pump casings 22a and 22b in which bulk getters 24a and 24b are mounted. As previously described, the getters 24, 24a and 24b preferably comprise ZrAl, but other suitable getter material may be employed.

A valve 26 is connected between the helium separator 14 and the pump casing 22 of the basic getter pump 20. Initially, the valve 26 is closed, and the pump casing 22 is evacuated to the greatest possible extent by any known or suitable vacuum pumping means. Moreover, the getter 24 is thoroughly degassed. The initial vacuum pumping has the effect of degassing the getter 24. Additional degassing may be achieved by heating the getter 24. Degassing techniques are well known to those skilled in the art.

Similarly, the other getters 24a and 24b are initially degassed, and the pump casings 22a and 22b are evacuated to the greatest feasible extent. After these preparatory steps, the valve 26 is opened so that the residual gases or effluent can flow from the fusion reactor 12 through the helium separator 14 and into the pump casing 22 of the basic getter pump 20. After the removal of the helium, the gaseous effluent contains a mixture of deuterium and tritium.

The getter 24 has the intrinsic ability or characteristic of absorbing deuterium and tritium, so that the getter obtains its initial loading of deuterium and tritium, as previously discussed. The getter 24 thus has a pumping effect upon the deuterium and tritium in the pump casing 22. When the desired quantity of effluent deuterium and tritium have been admitted into the pump casing 22, the valve 26 is closed. The absorption of the deuterium and tritium by the getter 24 tends to reduce the residual pressure in the casing 22 to an equilibrium pressure, as previously discussed. However, the desorption portion of the cycle can be started before equilibrium is achieved, if desired.

The desorption portion of the cycle is started in the basic stage 16 by pumping the casing 22 to a lower pressure. For this purpose, the inflow side of a vacuum pump 28 is connected to the pump casing 22 through a second valve 30 which is closed during the absorption portion of the cycle, but is opened when it is desired to start the desorption portion of the cycle. Conveniently, the vacuum pump 28 takes the form of a turbomolecular pump, but any other known or suitable type of vacuum pump may be employed.

Similarly, the inflow side of a vacuum pump 28a is connected to the pump casing 22a through a valve 30a. Likewise, a vacuum pump 28b is connected to the pump casing 22b through a valve 30b.

The vacuum pump 28 has an outflow conduit 32 which is connected through a valve 34 to the pump casing 22a. Similarly, the vacuum pump 28a has an outflow conduit 32a which is connected through the valve 34a to the pump casing 22b. Likewise, the vacuum pump 28b has an outflow conduit 32b which may be connected to the next stage of the tritium branch 18. If there is no additional stage, the outflow conduit 32b serves as the tritium outflow conduit of the separator system. The gases discharged from the outflow conduit 32b are tritium-enriched.

In the desorption portion of the cycle, the getters 24, 24a and 24b can be heated to a higher temperature, if desired, by any known or suitable heating means. The higher temperature produces a higher desorption rate, as previously discussed.

In the first stage 16, the desorption of the getter 24 is continued until the getter is partially desorbed. For example, the getter 24 may be desorbed approximately halfway, to about fifty percent of its original loading of tritium. As previously discussed, the desorption rate of tritium is greater than the desorption rate of deuterium, so that the gaseous outflow through the outflow conduit 32 is tritium-enriched. On the other hand, the gaseous content, remaining in the getter 24, is deuterium-enriched.

The tritium-enriched gaseous outflow from the conduit 32 is discharged through the valve 34 into the pump casing 22a of the getter pump 20a and is absorbed into the getter 24a. When the loading of the gases into the getter 24a has been completed, or carried out to the desired level, the stage 16a is shifted into the desorption portion of its cycle by closing the valve 34, stopping the vacuum pump 28, opening the valve 30a, starting the vacuum pump 28a, and opening the valve 30a. The vacuum pump 28a lowers the pressure in the pump casing 22a, so that desorption of the getter 24a is produced. The desorption rate may be increased by heating the getter 24a to a higher temperature. The tritium is desorbed from the getter 24a at a greater rate than the deuterium desorption rate, so that the gaseous outflow through the outflow conduit 32a is additionally tritium-enriched. From the outflow conduit 32a, the tritium enriched gaseous mixture is discharged through the valve 34a into the pump casing 22b of the stage 16b. When the desorption of the getter 24a has proceeded to the desired extent, such as approximately fifty percent of the original loading of tritium, the desorption of the getter 24a is terminated, by closing the valves 30a and 34a and by stopping the vacuum pump 28a. The gases remaining in the getter 24a are deuterium-enriched, compared with the original loading.

Each subsequent stage of the separator system is operated in the same manner. In the stage 16b, the additionally tritium-enriched gaseous mixture is absorbed into the getter 24b to the maximum possible extent, or at least to the desired extent. The desorption portion of the cycle is then started by starting the vacuum pump 28b and opening the valve 30b. The desorption rate may be increased by heating the getter 24b to a higher temperature. The gaseous outflow through the outflow conduit 32b is tritium-enriched to an even greater extent and is delivered to the subsequent stages, if any, of the separator system 10. If there is no subsequent stage, the conduit 32b serves as the tritium outflow conduit of the separator system. The degree of tritium enrichment, produced by the separator system, depends upon the number of stages which are provided. The tritium-enriched outflow can be pumped into a suitable tritium storage tank or other receptacle, not shown, and subsequently reused in the fusion reactor 12.

When the desorption of the tritium-enriched gases from the getter 24b has been carried to the desired extent, the valve 30b is closed and the vacuum pump 28b is stopped. The gaseous mixture remaining in the getter 24b is deuterium-enriched. It is desirable to recover the deuterium-enriched gaseous mixtures from the getters 24, 24a and 24b in the stages 16, 16a and 16b.

The deuterium-enriched gaseous mixtures can be recovered from the getters 24, 24a and 24b by desorbing the getters to a much greater extent than previously. The desorption of the getters 24, 24a and 24b can be continued until the getters are substantially completely desorbed.

To facilitate and control such desorption, the illustrated separator system 10 comprises additional valves 36, 36a, 36b and 36c, located at the opposite ends of the pump casings 22, 22a and 22b. Thus, the valve 36 is located at the left-hand end of the pump casing 22 and is adapted to open and close the pump casing 22 to a conduit 38. The valve 36a is connected between the right-hand end of the pump casing 22 and the left-hand end of the pump casing 22a. The valve 36b is connected between the right-hand end of the pump casing 22a and the left-hand end of the pump casing 22b. The valve 36c is located at the right-hand end of the pump casing 22b and is adapted to open and close the pump casing 22b to a conduit 40. During the loading and tritium desorption portions of the cycle, as previously described, all of the valves 36, 36a, 36b and 36c are kept closed.

During the deuterium desorption portion of the cycle, all of the getters 24, 24a and 24b can be desorbed simultaneously, by utilizing a suitable vacuum pump or pumps to pump down all of the pump casings 22, 22a and 22b to a substantially lower pressure than was employed previously, during the tritium desorption portion of the cycle. The desorption of the getters 24, 24a and 24b can be hastened by suitably heating them to a higher temperature.

For simultaneous desorption of the getters 24, 24a and 24b, a suitable vacuum pump (not shown) can be connected to the conduit 38, and the valves 36, 36a and 36b can be opened so that the vacuum pump can be employed to pump down all of the pump casings, 22, 22a and 22b simultaneously. The deuterium-enriched gas mixtures can thus be pumped simultaneously into a suitable deuterium tank or other receptacle (not shown) by the vacuum pump, connected to the conduit 38.

Another option is to use the vacuum pump 28b for simultaneously pumping down the pump casings 22, 22a and 22b. For this optional method, the outflow conduit 32b of the vacuum pump 28b is connected to a suitable deuterium tank or receptacle, not shown, instead of the previously-used tritium tank or receptacle, not shown. The valves 30b, 36a and 36b are opened, while the valves 36 and 36c are kept closed.

Figure 3:
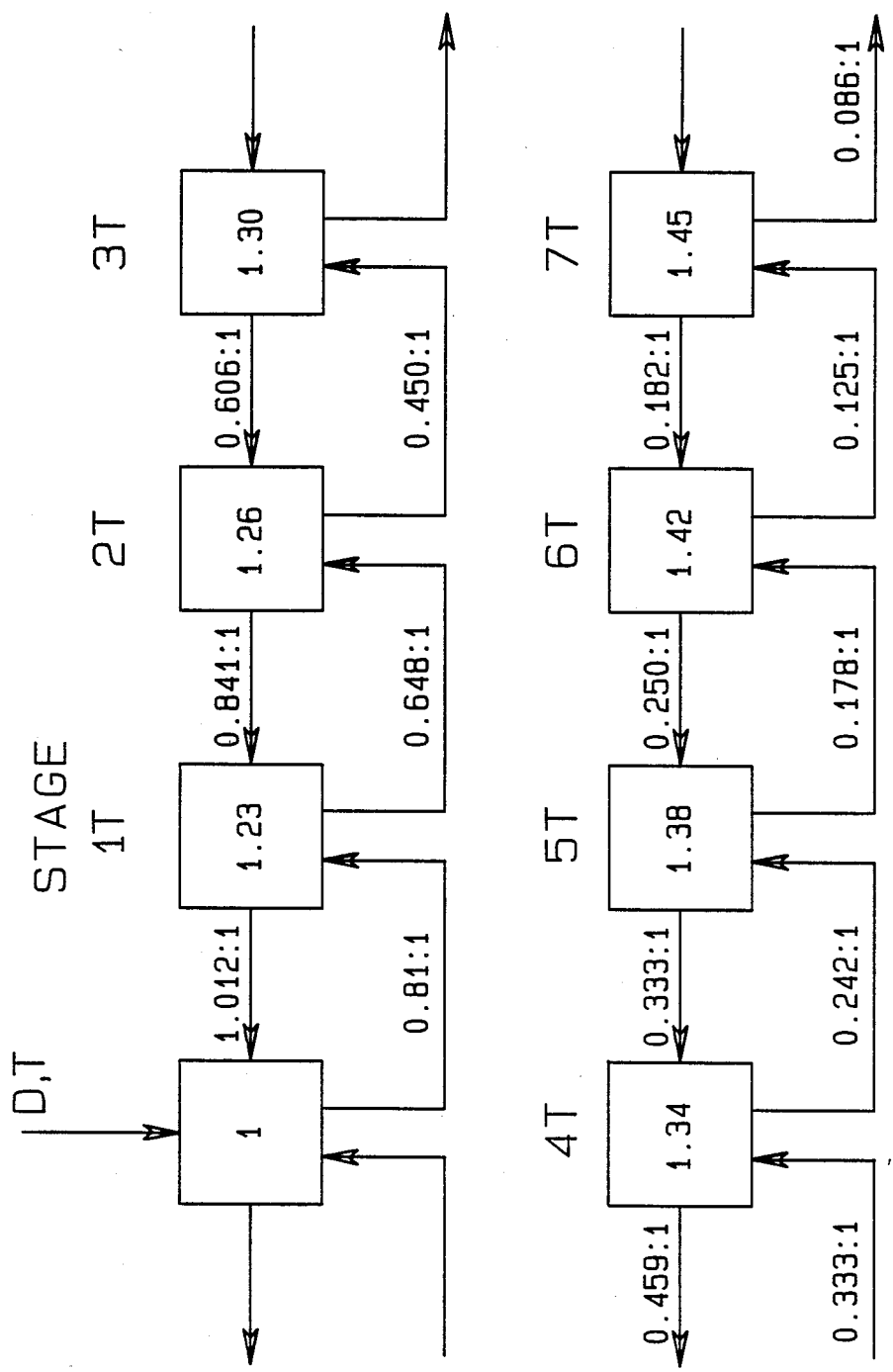
FIG. 3 is a simplified box diagram, corresponding with FIG. 2, and showing the isotopic dependence ratio D:T of the gas produced at each stage of the system, along with the tritium enrichment ratio per stage, shown in the boxes of the diagram, on the basis of using ZrAl bulk getters.

FIG. 3 is a schematic box diagram showing the isotopic dependence DP of the desorbed gas produced by each stage of a multistage separator, along with the tritium enrichment ratio per stage, shown in the boxes. This diagrammatic presentation applies to a multistage isotope separator utilizing a ZrAl bulk getter.

The present invention is applicable to other suitable bulk getters, in addition to zirconium-aluminum (ZrAl). For example, it has been found that the present invention is applicable to bulk getters made of zirconium-vanadium-iron alloys (ZrVFe), which also exhibit the property of desorbing tritium to a substantially greater extent than deuterium.

The present invention is also applicable to the separation of deuterium from normal hydrogen, in that the bulk getters exhibit greater desorption of deuterium than normal hydrogen. Furthermore, the invention is applicable to the separation of normal hydrogen and tritium, in that the bulk getters exhibit greater desorption of tritium than normal hydrogen.

As a preferred method, the operation of the isotope separator system 10 of FIG. 2 is as follows. First, the stage 0 getter 24 is filled with the spent reactor gas mixture DT to a moderately high loading ($q \approx 10$ Torr-liters/g). Then the getter 24 is desorbed by the turbomolecular vacuum pump (TMP) 28 until the getter is about half empty. This results in an enriched tritium mixture in the stage IT getter 24a, while the stage 0 getter 24 is enriched with deuterium which can be desorbed into another getter in deuterium stage ID of the deuterium branch (not shown). Henceforth, the operation of the deuterium branch is similar to the tritium branch and only operation of the tritium branch will be described. The partially tritium-enriched getter 24a of stage 1T is then half desorbed by the next TMP 28a into the stage 2T getter 24b. The remaining gas in the 1T stage getter 24a is desorbed back into the getter 24 at stage 0 which is also filled with fresh gas to restart the cycle. Enrichment into higher stages is similar.

For the case where the initial isotopic concentrations are equal ($q_D = q_T$), and using ZrAl getters, the resultant concentration ratios $q_D:q_T$ are shown in FIG. 3 for the tritium branch. Notice should be taken that the gas expelled backward has approximately the same isotopic ratio as the previous stage, and the enrichment ratio per stage (shown inside the boxes) increases from 1.23 to 1.45 from stage 1 to 7. The total enrichment ratio achieved at stage 7 is about 11.6 which can be increased by using more stages. Assuming typical operating parameters for a standard 80 gram getter, we estimate that the throughput for the isotope separator is about 1-5 Torr liters/sec. The exact value of the throughput depends on the input pressure and getter thermal cycling time for desorption. This system can be scaled for higher throughput, or the number of stages can be increased to achieve a higher degree of isotope separation.

The above example shows that significant isotope enrichment is possible using a relatively simple system of ZrAl getters, turbomolecular pumps and valves. This method of using bulk getters for hydrogen isotope separation is not restricted to this illustration. For example, it is possible that other bulk getters could be used which exhibit larger isotopic solubility dependences. Also, instead of using turbomolecular pumps for desorption, it is possible to use the bulk getters themselves for desorption. While the system described is shown for a fusion reactor to separate deuterium and tritium, this bulk getter isotope separator can be used for any application requiring the separation of hydrogen isotopes.

There are several different hydrogen isotope separation methods which have been previously disclosed and could be used in connection with a fusion reactor. Such methods include cryogenic distillation, gas chromatography, and thermal diffusion. Cryogenic distillation separates the different hydrogen isotopes at their boiling points ($\approx 20$ degrees K.). While cryogenic distillation is presently considered by some persons skilled in the art to be the most practical isotope separator method for a fusion reactor, such method suffers from the problem that it requires a very large tritium inventory greater than 100 g ($10^6$ Ci). Also, the typical cost of a cryogenic distillation separator is several millions of dollars. As alternatives, gas chromatography and thermal diffusion have been investigated. The difficulty with these methods is that the throughput is small ($\approx 0.1$ Torr liter/sec). The advantage of the bulk getter isotope separator of the present invention is that the throughput can be designed to be sufficient for a fusion reactor ($\approx 10$ Torr liters/sec) while the tritium inventory is small ($\approx 1$ gram). Moreover, the present invention does not require the handling of either liquid or high pressure tritium.

We claim:

1. A method of separating tritium and deuterium from a gaseous mixture thereof, said method comprising the steps of:
   providing a bulk getter in a casing, said getter having the capability to absorb deuterium and tritium, and the capability to desorb tritium at a greater rate than deuterium,
   introducing the gaseous mixture into the casing, causing the absorption of the tritium and the deuterium from the gaseous mixture into the getter to produce an initial loading of the getter,
   selectively desorbing a portion of the tritium and deuterium from the getter to produce a desorbed mixture which is tritium-enriched in respect to deuterium,
   pumping the desorbed tritium-enriched mixture into a separate container, the remaining gaseous loading in the getter being deuterium-enriched in respect to tritium,
   desorbing the getter to a substantially greater extent to produce a deuterium-enriched gaseous mixture, and
   removing the deuterium-enriched mixture into another container.

2. A method according to claim 1, in which the getter comprises a zirconium-aluminum alloy.

3. A method according to claim 1, in which the getter comprises a zirconium-vanadium-iron alloy.

4. A method according to claim 1, in which the selective desorption of the getter is carried out until the gaseous loading of the getter is approximately fifty percent of the original loading.

5. A method according to claim 1, in which the tritium-enriched mixture is subjected to at least one additional stage of absorbing the mixture into a getter,
   partially desorbing the second-mentioned getter to produce a desorbed mixture which is further tritium-enriched,
   removing the further tritium-enriched mixture,
   desorbing the second-mentioned getter to a substantial additional extent to produce a desorbed mixture which is deuterium-enriched,
   and removing the last-mentioned deuterium-enriched mixture.

6. A method of separating heavier and lighter hydrogen isotopes from a gaseous mixture thereof, said method comprising the steps of:
   providing a bulk getter in a casing said getter having the capability to absorb heavy and light hydrogen isotopes, and the capability to desorb the heavier isotope at a greater rate than the lighter isotope,
   introducing the gaseous mixture into the casing,
   causing the absorption of the hydrogen isotopes from the gaseous mixture into the getter to produce an initial loading of the getter,
   selectively desorbing a portion of the isotopes from the getter to produce a desorbed mixture which is enriched with the heavier isotope,
   pumping the desorbed mixture into a separate container,
   the remaining gaseous loading in the getter being enriched with the lighter isotope,
   desorbing the getter to a substantially greater extent to produce a gaseous mixture which is enriched with the lighter isotope,
   and removing the last-mentioned mixture into another container.

7. A method according to claim 6, in which the getter comprises a zirconium-aluminum alloy.

8. A method according to claim 6, in which the getter comprises a zirconium-vanadium-iron alloy.

9. A method according to claim 6 in which the selective desorption of the getter is carried out until the gaseous loading of the getter is approximately one-half of the original loading.

10. A method according to claim 6, in which the heavier isotope-enriched mixture is subjected to at least one additional stage of absorbing the mixture into a getter,
    partially desorbing the second-mentioned getter to produce a desorbed mixture which is further enriched with the heavier isotope,
    removing the last-mentioned desorbed mixture,
    desorbing the second-mentioned getter to a substantially greater extent to produce a desorbed mixture which is enriched with the lighter isotope,
    and removing the last-mentioned mixture.

* * * * *